United States Patent [19]

Matsunaga

[11] 3,901,983

[45] Aug. 26, 1975

[54] PROCESS FOR MAKING DEFATTED PEANUT FLOUR

[76] Inventor: Akihiro Matsunaga, 32-4, Higashi-Ikebukuro, 2-chome, Toshima-ku, Tokyo, Japan

[22] Filed: Feb. 13, 1974

[21] Appl. No.: 442,241

[52] U.S. Cl. ............... 426/427; 426/148; 426/443; 426/465; 426/471; 426/473
[51] Int. Cl.² .......................................... A21D 6/00
[58] Field of Search ........... 426/148, 427, 443, 465, 426/471, 472

[56] References Cited
UNITED STATES PATENTS

| | | | |
|---|---|---|---|
| 617,266 | 1/1899 | Watson | 426/148 |
| 2,128,850 | 8/1938 | Richards | 426/353 |

OTHER PUBLICATIONS

Agricultural and Food Chemistry, Vol. 11, No. 4, Page 321, July/August 1963.

*Primary Examiner*—Raymond N. Jones
*Attorney, Agent, or Firm*—Martin J. Spellman, Jr.; Richard A. Joel

[57] ABSTRACT

Shelled and skinned peanuts are treated in a substantially saturated saline solution at a temperature of about 20° to 50°C for 30 seconds to 5 minutes in order to remove tannin and odor associated with peanuts. The peanuts are then heat treated in water at a temperature of about 100° to 120°C for from 15 to 45 minutes. The peanuts thus treated then have the oil removed from them by crushing in an oil extractor. The solid of crushed peanuts is then formed into a slurry and treated in a colloid mill so that the peanuts will pass through a 400 mesh screen. The peanut slurry is then spray dried to form a free-flowing defatted peanut flour useful in many food formulations.

4 Claims, No Drawings

PROCESS FOR MAKING DEFATTED PEANUT FLOUR

BACKGROUND OF THE INVENTION

This invention concerns an improved flour manufactured from peanuts and a new process for making such flour.

It is well known that peanuts are very high in nutritive food value, and besides the well-known practices of consuming peanuts whole, in candies, peanut butter, and the like, peanuts in the form of flour can be consumed directly as a nutritive substance when suspended in water or milk products, either plain or flavored. Peanut flour has been used as an enriching component in many different foods, particularly in underdeveloped countries.

Typically, peanuts are comprised of approximately 3 to 4% water, 45 to 48% raw fat, 0.5 to 1% raw fiber, 30 to 32% protein, 15 to 16% soluble non-nitrogeneous substances, and 2 to 2.5% ash in the form of phosphoric acid and alkali. The composition will, of course, vary somewhat depending on the geographic source of the peanuts, such as Nigeria or Virginia.

It is thus clear that the peanuts are high in nutritive value. When processed in the form of flour, they can be utilized to enhance the food value of many edible substances.

One of the difficulties which has been encountered in processing peanuts to flour form is the difficulty of removing tannin and other impurities, as well as the inherent odor of peanuts which is objectionable for many applications. In addition, difficulty has been encountered in pulverizing the peanuts to a free-flowing white flour.

While various processes are known for accomplishing these ends, they are extremely expensive and/or have an adverse effect on the fats and proteins in the peanuts, tending to partially degrade them, causing a change in the taste or making pulverization of the peanuts into flour form difficult. Changes in the fat composition which constitutes a major portion of the components of peanuts has been a major problem.

These difficulties have largely been overcome in the case of peanuts from which no oil has been removed by the process described in my co-pending application Ser. No. 299,733 filed Oct. 24, 1972 entitled "Improved Peanut Flour and Method of Making Same", now U.S. Pat. No. 3,829,589.

There is, however, a large market demand for a defatted peanut flour in which the peanut oil has been removed from the peanuts so as to reduce the percentage of oil present in the final flour product to below 20% and preferably below 5% by weight and at the same time be able to successfully remove the tannin and other impurities as well as the inherent objectionable odors of the peanuts. It is also important that the end product be a free-flowing white to off-white powder. It is also important that for economical reasons the oil that is removed from the peanuts be recovered in useable form and not be degraded or have to be thrown away as waste.

SUMMARY OF THE INVENTION

According to the present invention, there is provided a process for the manufacture of an improved defatted peanut flour in which the content of the fat is reduced below 20% by weight and which is essentially odorless, substantially free of tannin and other common impurities usually encountered in peanuts and is white to off-white in color. The present process also provides for obtaining the peanut oil in relatively pure form. The powder obtained is a fine free-flowing flour powder high in nutritive value and very tasty, but contains 20% or less fat by weight and even below 5% by weight of fat. The process of the present invention which removes the odor, tannin and impurities from the peanuts utilized and facilitates the extraction of the oil from the peanuts and the processing into a fine free-flowing powder does not deteriorate the protein or other constituents of the peanuts to cause any deterioration in the flavor of the peanuts. The fat which is removed from the peanuts is also obtained without degradation and with little waste. According to the process of the present invention, vastly improved defatted peanut flour and peanut oil are obtained by a process which comprises first gently parching the shelled peanuts for s short period of time in dry heat to facilitate removal of the thin skin, removing the skins in a conventional de-skinning operation, and then soaking the peanuts in a substantially saturated saline solution at a temperature of from 20° to 50°C. for approximately 30 seconds to 5 minutes.

The peanuts are then removed from the saline solution and heat treated in water at a temperature from about 100°C to about 120°C from 15 to 45 minutes. Where the temperature is above 100°C, the heating step is carried out in a closed vessel under low pressures sufficient to be able to raise the temperature of the water to 120°C.

The preferred temperature for soaking the peanuts in the saline solution is from 30° to 40°C. If the temperature is too low, the full effect of the steeping treatment is not obtained, while at exceedingly higher temperatures, part of the protein content of the peanut is dissolved which alters the food value and taste of the peanut.

The steeping treatment serves to remove the tannin, mold, soil bacteria, and other common impurities present in the peanuts, and most especially serves to remove the objectional odor which is associated with peanuts. Since during the treatment the peanuts are floated in a saline solution, other gross impurities such as sand, gravel, insect parts, and the like are further removed. I have also found that the steeping or soaking treatment facilitates the subsequent pulverization of the peanuts into the free-flowing flour. In the saline soak step, it is preferred that approximately one kilogram of peanuts be treated in approximately one to five litres of the saline solution, with the most preferred ratio being 1 kilogram of peanuts in 2 litres of solution.

In an alternative embodiment of the process of this invention, the peanuts are treated in an alkaline solution prior to the saline soaking step. In this embodiment, the peanuts are soaked in a 0.6 to 1% solution of caustic soda for about 2 to 5 minutes, which is followed by washing with water and then the saline soak as indicated.

A further alternative embodiment is that following the saline soaking step, the peanuts can be dried or parched at a temperature of 80° to 100°C. for 15 to 25 minutes. This additional parching treatment seems to enhance the effects of the subsequent heat treatment in the water and enhances the inherent savoriness of the peanuts.

The peanut flour obtained by the process of the present invention can be added to various drinks such as water-based drinks and milk with or without the addition of sugar to form a highly concentrated food. In addition, the flour can be added to many other food products in order to greatly enhance their nutritive value and impart its unique flavor to the products. For example, the peanut flour of the present invention has been used as a substitute for ordinary wheat flour in amounts up to 50% of the amount of flour called for by recipes utilizing ordinary wheat flour.

The wet heat treatment serves to remove any caustic and salt which has been absorbed into the peanuts as a result of the previous steeping treatments in the saline or alkali solutions as well as fully removing the tannin, odor, etc. During the heat treatment, approximately 1 to 5 litres of water are employed per kilogram of peanuts with 1.5 to 2 litres of water being preferred, although this is apparently not critical.

DESCRIPTION OF PREFERRED EMBODIMENTS

The following examples will further serve to illustrate the nature of my invention. In the following example, the peanuts utilized have been shelled and initially parched to remove the thin skins by heating them for from 3 to 6 minutes at temperatures ranging from 50° to 90°C., and treating them in a skinning machine. It is preferred that the heat treatment be repeated following washing of the peanuts in clear water, the second heat treatment generally being conducted at the lower temperature ranges. The peanuts are then placed in a heavy-duty extractor which crushes the peanuts and extracts the oil from the peanuts leaving a solid, only slightly wet cake. The liquid phase is then centrifuged to separate the oil phase from the water phase.

The peanuts should be treated in an extraction step so that the solid phase comprises from about 52 to 58% by volume. This will vary of course somewhat depending upon the source of the peanuts and the amount of water in the surface of the nuts from the previous heat treating step.

The solids phase obtained in the extraction process is then diluted with approximately 70 to 80% by volume of water. The amount of water added, however, can vary depending upon the moisture content of the solid. It is desired to form a slurry of a soup-like consistency where it is treated to break up fibrous structures and to reduce the size of the solid so that the slurry will pass through a 400 mesh screen.

Following treatment in the colloid mill, the suspension of peanut solids is then fed to a conventional spray dryer where it is dried to form a free-flowing powder.

EXAMPLE

One kilogram of peanuts from which the thin skins have been removed following the parching treatment of 80°C. for 4 minutes are soaked in 2 litres of a saturated saline solution at a temperature of 30°C. for approximately 1 minute. The peanuts are then heat treated in 1.5 litres of water at a temperature of 100°C for 20 minutes. Following the heat treatment, the peanuts are removed from the water and placed in an oil extractor in which they are crushed and the oil and water present removed. The solids comprise about 50% of the volume. The oil and water phases are separated by centrifuging in a centrifuge.

The crushed peanuts from which the oil has been substantially removed by the extraction process are then formed into a slurry by the addition of approximately 75% by volume of water and the slurry placed in a colloid mill and treated so that the peanuts pass through a 400 mesh screen. Thereafter the slurry of peanuts is spray dried using conventional equipment. There results a free-flowing slightly off-white defatted peanut flour which is very tasty and useful as a food supplement.

While the invention has been explained by a detailed description of certain specific embodiments, it is understood that various modifications and substitutions can be made in any of them within the scope of the appended claims which are intended also to include equivalents of such embodiments.

I claim:

1. A process for the manufacture of defatted peanut flour comprising treating skinned peanuts in a substantially saturated saline solution at a temperature and for a period of time to remove tannin and the odor associated with peanuts and thereafter treatment said peanuts in water at a temperature of about 100°C to 120°C for 15 to 45 minutes, and thereafter extracting the oil from said peanuts by a crushing of said peanuts, separating the resulting solid phase comprising crushed peanut meats from the resulting oil and water phases, forming a slurry of peanuts in a colloid mill in order that said peanuts will pass through a 400 mesh screen, and then spray drying the peanuts to thereby obtain a free-flowing defatted peanut flour.

2. A process as claimed in claim 1 wherein said oil and water phases are centrifuged to separate said oil from said water.

3. A process as claimed in claim 1 wherein the amount of water added to said peanuts following oil extraction is from 70 to 80% by volume.

4. A process as claimed in claim 1 wherein said peanuts are soaked in said saline solution for about 0.5 to 5 minutes at a temperature of from about 20° to about 50°C.

* * * * *